United States Patent [19]
Frötschner et al.

[11] 4,260,330
[45] Apr. 7, 1981

[54] IMPELLER BLADE FOR A HYDRODYNAMIC TORQUE CONVERTER

[75] Inventors: Eberhard Frötschner, Gerlingen; Hans-Georg Offterdinger, Ostfildern, both of Fed. Rep. of Germany

[73] Assignee: Daimler-Benz Aktiengesellschaft, Stuttgart, Fed. Rep. of Germany

[21] Appl. No.: 67,789

[22] Filed: Aug. 20, 1979

[30] Foreign Application Priority Data

Aug. 19, 1978 [DE] Fed. Rep. of Germany ....... 2836332

[51] Int. Cl.³ .................................................. F16H 41/26
[52] U.S. Cl. ........................................................ 416/180
[58] Field of Search ................. 416/180; 29/156.8 FC; 60/361, 362

[56] References Cited

U.S. PATENT DOCUMENTS

| | | | |
|---|---|---|---|
| 2,598,620 | 5/1952 | Swift | 29/156.8 FC X |
| 2,772,538 | 12/1956 | Ullery | 416/180 X |
| 2,917,001 | 12/1959 | Zeidler et al. | 416/180 |
| 2,989,004 | 6/1961 | Zeidler et al. | 416/180 X |
| 3,316,622 | 5/1967 | Jandasek | 416/180 X |
| 3,797,243 | 7/1972 | Trusov | 60/361 |
| 4,098,080 | 7/1978 | Pogorelov | 416/180 X |

FOREIGN PATENT DOCUMENTS

400755 4/1974 U.S.S.R. ................................... 416/180

*Primary Examiner*—Leonard E. Smith
*Attorney, Agent, or Firm*—Craig & Antonelli

[57] ABSTRACT

A blade of an impeller for a hydrodynamic torque converter wherein the central flow thread at the point of the leading edge is displaced with respect to a central flow thread at a point of the trailing edge along a smaller wheel diameter as well as by an angle of rotation leading in a direction of rotation of the impeller. The trailing edge is disposed in a radial plane at least approximately perpendicular to an axis of rotation of the impeller. The leading edge of the point of the central flow thread has a leading angle of about 30° to 40° and the trailing edge is inclined in such a way that its corner point at an inner torus, delimiting an inner side of the impeller, is displaced by an angle of rotation in the direction of rotation toward the front with respect to its corner point at the outer torus which delimits the outer portion of the impeller.

22 Claims, 13 Drawing Figures

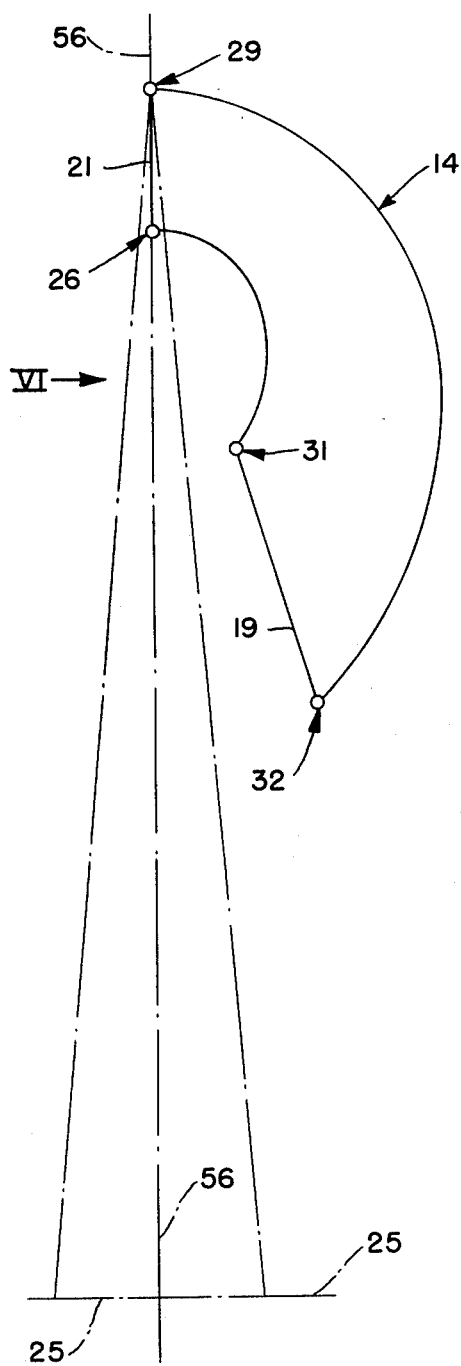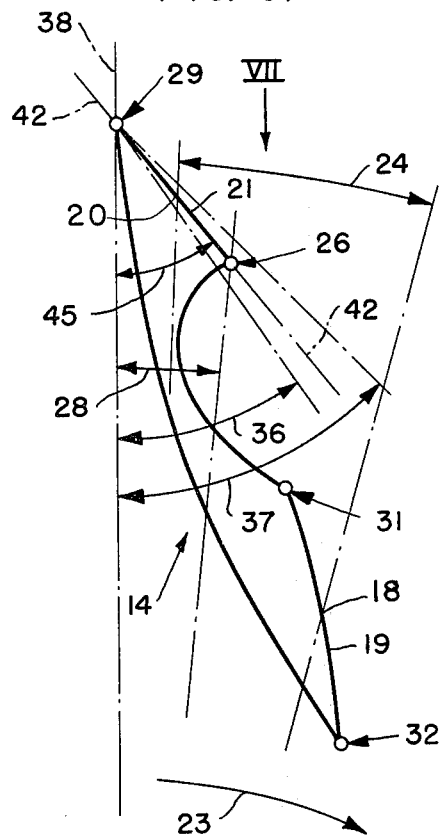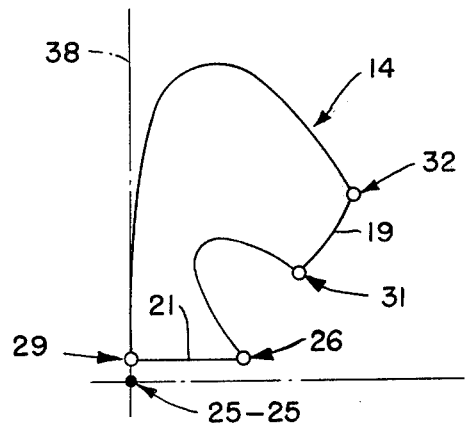

IMPELLER BLADE FOR A HYDRODYNAMIC TORQUE CONVERTER

The present invention relates to a hydrodynamic torque converter and, more particularly, to a blade of an impeller for a hydrodynamic torque converter. A blade of an impeller for a hydrodynamic torque converter has been proposed wherein a central flow thread at the point of a leading edge of the blade is displaced with respect to the central flow thread at the point of the trailing edge along a smaller wheel diameter as well as by an angle of rotation leading in the direction of rotation of the impeller blade. The trailing edge is disposed in a radial plane at least approximately perpendicular to the wheel axis.

Such an obliquely oriented blade results from the usual design of a hydrodynamic centripetal torque converter wherein the starting point is conventionally the meridional section of the converter circuit which includes an impeller, turbine wheel, and stator or idler wheel delimited by an outer torus and an inner torus. The mutual positioning of these outer and inner limitations of the operating cycle is essentially determined by the requirement that the cross-sectional flow remain constant in the entire cycle along the central flow thread. In this connection, the central flow thread divides the cross-sectional area into two porions of equal size and yields the geometrical data for the flow thread computation of the total converter.

The total cross-sectional area is subdivided into several partial converters of equal area then, retaining the above-mentioned condition of the sameness of the area, the flow thread valid for each partial converter is determined. Also, it is possible to ascertain, by way of conventional fluid flow or pipe computations, the oblique positioning of the impeller blades as well as the blade twist at the leading and trailing edges of the blade wheels.

While a slipping, which occurs in hydrodynamic torque converters between the input and output sides, actually results during a transmission of power in a power loss primarily proportional to the slip, in a hydrodynamic torque converter operating in the power transmission train of a motor vehicle, this slippage is of advantage insofar as the slippage makes it possible to render necessary starting and reversing operations shock-free and free of wear and tear. However, due to the power losses, efforts have been made to keep the slippage in the remaining driving range, wherein the clutch or coupling range of the torque converter is effective, at a minimum.

To maintain the power losses in the clutch range at a low level, several measures may be considered. First, the effective converter diameter may be enlarged and, second, the use of an additional converter bridging clutch is possible.

However, a disadvantage of enlarging the converter diameter as well as using a converter bridging clutch requires additional mounting space in addition to increasing the weight of the converter and rendering the converter arrangement more expensive.

A torque converter having a larger diameter also exhibits torque absorption parabolas which have a steeper configuration in the starting range and cannot, in every case, be corrected back to a lower initial value by the selection of different blade angles in the pump, turbine, and stator. In this connection, one would have to tolerate a larger crawling torque or moment which is in no way desirable or a larger idling torque or moment which places a load on the drive engine.

Furthermore, by providing an additional bridging clutch, such clutch would require additional costly control elements thereby burdening the torque converter which heretofore operated free of wear and tear with an element prone to wear and tear in addition to impairing the shifting comfort of an automatic motor vehicle transmission.

However, the design and construction of blades of a hydrodynamic converter have heretofore been carried out with the viewpoint that the conversion of the power to be transmitted from mechanical energy into kinetic energy and vice versa, should be insured to take place with a uniform distribution over the entire blade area and, if at all possible, over the entire operating range in order to obtain, at given starting conditions, the optimum degree of efficiency in the conversion range.

In contrast thereto, the aim underlying the present invention essentially resides in constructing a blade for an impeller of a hydrodynamic torque converter so that the slip-caused power losses of the torque converter are reduced in the clutch range, that is, at higher speed conditions, without enlarging the diameter of the converter and without requiring a structural expenditure for a converter bridging clutch.

In accordance with advantageous features of the present invention, the leading edge at a point of the central flow thread has a leading angle of about 30° to 40° and the trailing edge is inclined in such a manner that its corner point, at an inner torus, is displaced by an angle of rotation in the direction of rotation toward the front with respect to its corner point at the outer torus.

By virtue of an impeller blade constructed in accordance with the present invention, the flow is advantageously urged in a direction toward the outer contour due to the inclination of the trailing edge of the impeller blade. The larger power transmission factor of the partial converter, realizable at that location through the radius relationship and blade angles, then results in total in a higher power transmission factor of the total converter. In this manner, the greater power transmission capacity present in the outer flow regions or conduits, close to the outer limits of the hydrodynamic circuit, is exploited to an even higher degree than in previously proposed impeller blade constructions.

By the dimensioning of the leading or entering angle of the impeller blade of the present invention at a point of a central flow thread and the leading edge, it is insured that there will be no increase in the power transmission capacity effective in the zone of small or lower speeds, i.e., in the starting range.

In this connection, it is intentionally tolerated that there may possibly be hydrodynamic overloads in the converter start-up range at parts of the blades of the converter circuit, that is, the impeller blade, turbine blade, and/or stator blade, during conversion of mechanical energy into kinetic or flow energy or vice versa. Thereby, the converter characteristics in the starting range retain the usual values attainable even without the features of the present invention. The disadvantages for the starting range, which actually would be inherent in a raise of the power transmission capacity, do not arise in the impeller blade construction in accordance with the present invention.

The blade construction of the present invention is distinguished, in particular, by the fact that a perceptible increase in the power transmission capacity is attained exclusively in the frequently used operating range in the proximity of the clutch point and in the clutch range.

In order to obtain a surge-free flow stream in the range of the clutch point, in accordance with the present invention, a leading angle at the point of the central flow thread and the leading edge of 36° has proven to be especially advantageous.

An especially satisfactory transmission capacity in the clutch point results in the blade of the present invention by providing the leading edge with a twist, making the leading angle at the point of the leading edge and inner torus smaller by about 10° to 15° while it is made to be about 5° to 10° larger at the point of the leading edge and outer torus than the leading angle at the point of the leading edge and central flow thread.

Advantageously, in accordance with the present invention, the leading angle of the impeller blade may be varied along the leading edge in the configuration of a parabola.

In the blade of the present invention with an inclined trailing edge, good values for an increased power transmission capacity in the clutch zone are obtained with angles of inclinaion of between 35° and 45°. The most favorable inclination of the trailing edge required for an optimum effect, has been proven to be an angle of inclination of about 40°.

In order to be able to provide for an economical manufacturing of the torque converter of the present invention with high output or unit quantities, advantageously, the utilization of the same type of converter for engines with different power ratings is desirable.

With the blade of the present invention, a high power transmission capacity for a spectrum of engines covering varying power ratings is attained by providing that the trailing angle, at the point of the trailing edge and of the central flow thread, is about 85° to 110°. A trailing angle of 99° at the point of the trailing edge and of the central flow thread proved to be particularly advantageous for obtaining a high power transmission capacity when constructing the torque converter for an array of engine types.

To reduce the rise in power transmission capacity at the starting point obtained by the impeller blade of the present invention by the inclination of the trailing edge, it has been proven to be advantageous to make the trailing angle at the point of the inner torus and trailing edge larger by about 15° to 25°, while the trailing angle at the point of the trailing edge and outer torus is made smaller by about 8° to 10° than the trailing angle at the point of the trailing edge and the central flow thread.

In this connection, it is furthermore advantageous in the impeller blade of the present invention that the trailing angle varies in the manner of a parabola along the trailing edge.

The trailing edge in the impeller blade of the present invention can advantageously be located on a straight line inclined with respect to the axial plane.

It has proven to be advantageous with the impeller blade of the present invention, especially in those cases wherein the blade body is joined to the inner and outer tori by soldering, in order to take into account occurring thermal stresses, to locate the trailing edge in a plane of inclination intersecting the axial plane at a corner point lying at the outer torus, with the plane of inclination having a curvature which is convex in relation to the rotation of the impeller blade.

Accordingly, it is an object of the present invention to provide an impeller blade for a hydrodynamic torque converter which avoids, by simple means, shortcomings and disadvantages encountered in the prior art.

Another object of the present invention resides in providing an impeller blade for a hydrodynamic torque converter which does not increase the size or weight of the converter.

Another object of the present invention resides in providing an impeller blade for a hydrodynamic torque converter which reduces the slip-caused power losses at higher operating speeds.

A still further object of the present invention resides in providing an impeller blade for a hydrodynamic torque converter which insures no increase in the power transmission capacity effective in the starting range of the converter.

Another object of the present invention resides in providing an impeller for a hydrodynamic torque converter which exhibits increased power transmission capacity in the clutch zone.

A further object of the present invention resides in providing an impeller blade for a hydrodynamic torque converter by which the torque converter is readily utilizable for engines with different power ratings.

Yet another object of the present invention resides in providing an impeller blade for a hydrodynamic torque converter which functions reliably under all operating conditions.

Another object of the present invention resides in providing an impeller blade for a hydrodynamic torque converter which is simple in construction and therefore relatively inexpensive to manufacture.

These and other objects, features, and advantages of the present invention will become more apparent from the following description when taken in connection with the accompanying drawings, which show, for the purposes of illustration only, two embodiments in accordance with the present invention, and wherein:

FIG. 5 is a lateral view of a first embodiment of the impeller blade of the present invention in an installed position;

FIG. 6 is a front view of the impeller blade of the present invention taken in the direction of the arrow VI in FIG. 5;

FIG. 7 is a view of the impeller blade of the present invention taken in the direction of the arrow VII of FIG. 6;

Figure 12:
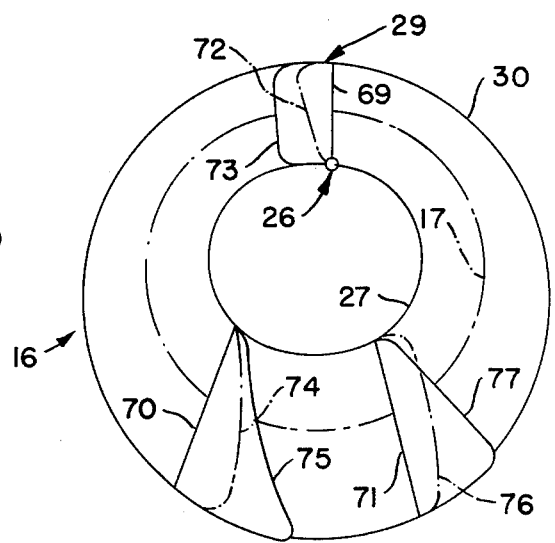
Figure 13:
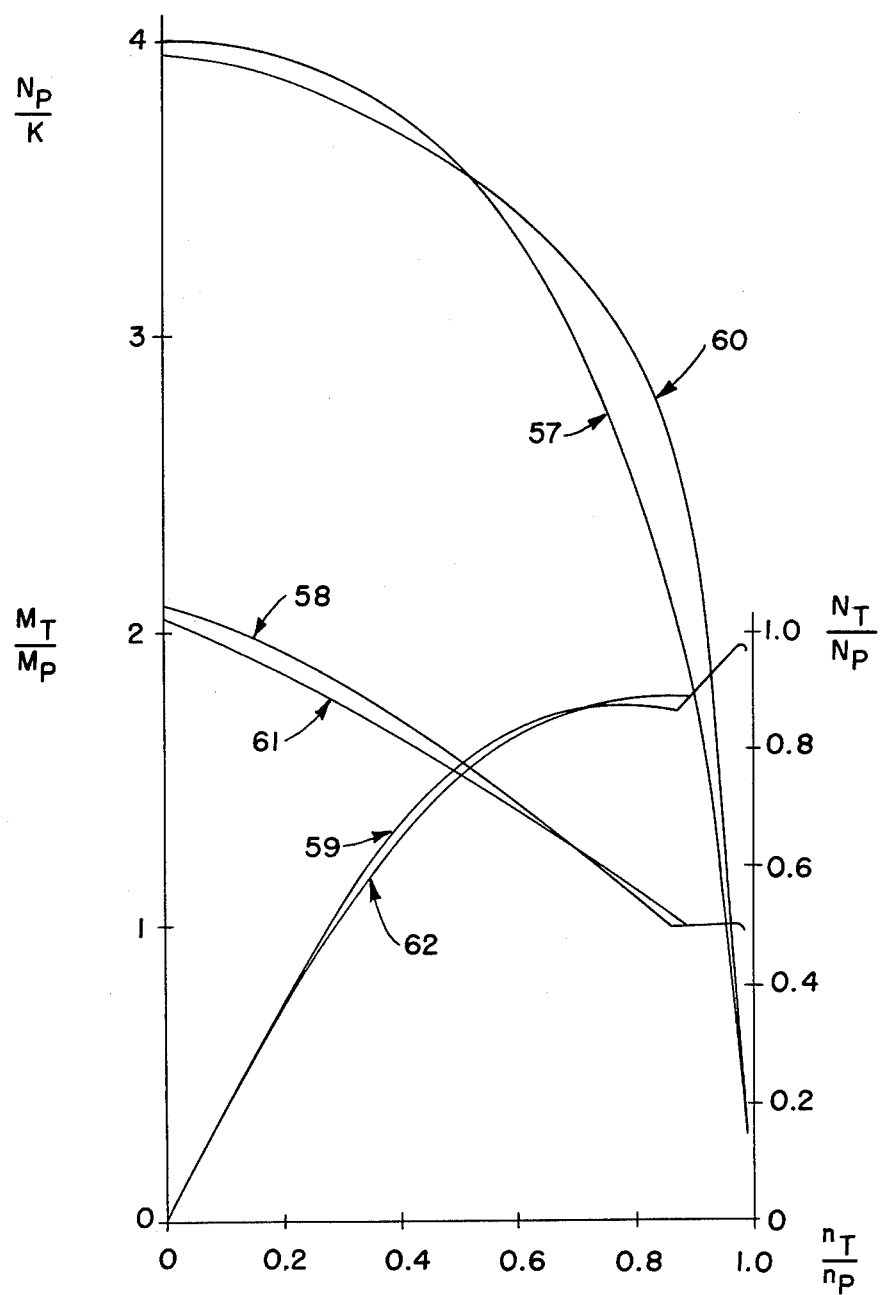

FIG. 12 is a meridional velocity distribution at the trailing blade edges of the impeller, turbine wheel, and stator with the blade of the impeller constructed in accordance with either embodiment of the present invention; and FIG. 13 is a graphical representation of characteristic curves of a conventional hydrodynamic torque converter and a hydrodynamic torque converter being provided with an impeller blade construction in accordance with either embodiment of the present invention.

Figure 1:
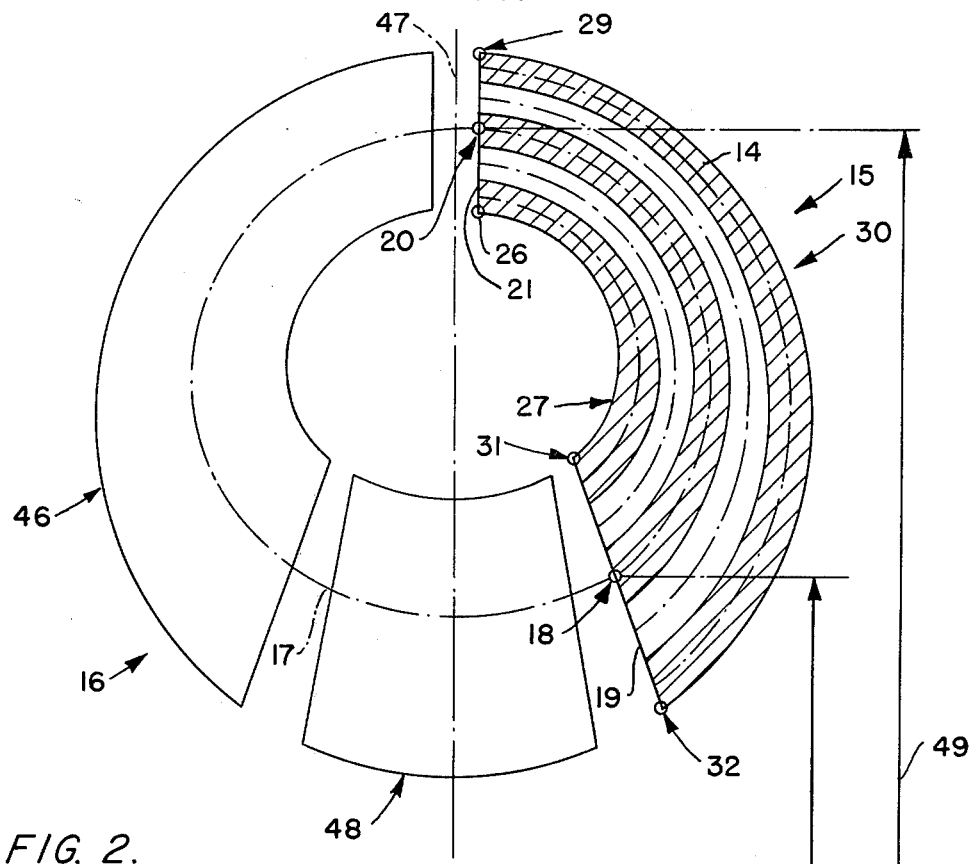
FIG. 1 is a schematic view of a converter circuit of a hydrodynamic torque converter in accordance with the present invention.

Referring now to the drawings wherein like reference numerals are used throughout the various views to designate like parts and, more particularly, to FIG. 1, according to this figure, a symmetrical centripetal torque converter generally designated by the reference numeral 16 includes an impeller 15 and a turbine wheel 46 arranged symmetrically to a plane of symmetry 47—47 which, in turn, is arranged perpendicularly to an axis of rotation 25—25 of the torque converter 16. A stator 48, completing the converter circuit, is arranged between the impeller 15 and turbine wheel 46 centrally with respect to the plane of symmetry 47—47. The impeller 15, turbine wheel 46, and stator 48 are delimited by an inner torus generally designated by the reference numeral 27 and an outer torus generally designated by the reference numeral 30.

When the torque converter 16 is connected into a power transmission train of a vehicle, the impeller is driven, in the conventional manner, by the vehicle engine; whereas, the turbine wheel 46 cooperates with an input shaft (not shown) of a change-speed transmission (not shown). The stator 48 is then supported in a conventional manner by a freewheeling mechanism (not shown) against a non-rotating stator shaft (not shown).

The torque converter 16 in FIG. 1 is illustrated in a meridional section wherein a central flow thread 17 is indicated in dot-dash lines.

FIG. 1 merely generally illustrates the contour of a blade 14 of an impeller 15 with the blade 14 including a leading edge 19 and a trailing edge 21. The central flow thread is located at a point generally designated by the reference numeral 18 on the leading edge at a smaller radius than a point generally designated by the reference numeral 20 of the trailing edge 21 which is disposed at a radius 49 with respect to the converter axis of rotation 25—25. Additionally, the blade 14 is positioned so as to be inclined in such a manner that an axial plane, encompassing the point 18 of the central flow thread 17 and the leading edge 19, has an angle of rotation which is leading in a direction of rotation of the impeller 15 with respect to an axial plane extending through the axis of rotation 25—25 of the converter 16 and containing the point 20 of the central flow thread 17 at the trailing edge 27. The trailing edge 27 is disposed in a radical plane perpendicular to the axis of rotation 25—25 of the converter 16.

The present invention is based upon the aforementioned construction of an impeller blade 14 and, in a first embodiment shown in FIGS. 5-7, the trailing edge 21 of the blade 14 is located on a radial plane 56—56 (FIG. 5) which is disposed perpendicular to the axis of rotation 25—25 of the converter 16 as well as in a plane of inclination 42—42 (FIG. 6) containing the corner point 29 of the trailing edge 21 at the outer torus in addition to being inclined under an angle of inclination 45 with respect to an axial plane 38—38. The axial plane 38—38 contains the corner point 29 as well as the axis of rotation 25—25 of the converter 16. The arrangement is such that a corner point 26 of the trailing edge 21 lying at the inner torus 27 is displaced by an angle of rotation 28 in the sense of rotation 23 of the impeller 15 in a forward direction the respect to the corner point 29 lying at the outer torus 30. The angle of inclination 45 is about 40° and it was found that the power transmission capacity in the clutch range is not substantially impaired if the position of the plane of inclination 42—42 is varied between the angle of inclination 36 of 35° and the angle of inclination 37 of 45°.

FIG. 6 also indicates that, with an angle of rotation 24, an arrangement is provided according to which the central flow thread 17 at the point 18 of the leading edge 19 is displaced in the direction of rotation 23 of the impeller 15 in the forward direction with respect to the central flow thread 17 at the point 20 of the trailing edge 21.

Figure 8:
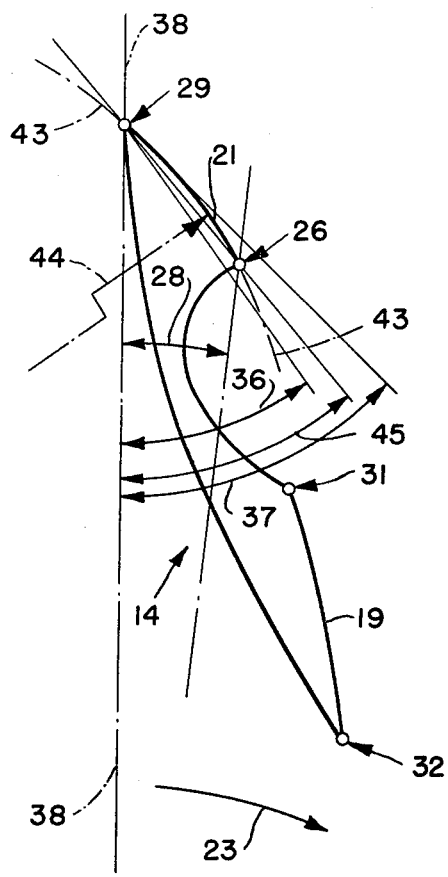
FIG. 8 is a front view of a second embodiment of an impeller blade in accordance with the present invention.

FIG. 8 provides an example of a second embodiment of a blade 14 for an impeller 15 of a torque converter 16 with the second embodiment differing from the first embodiment merely in that the trailing edge 21 is disposed in a curved plane 43—43 which also contains the corner point 29 of the trailing edge 21 at the outer torus 30, which corner point 29 is located in the axial plane 38—38. However, the plane 43—43 has a curvature 44 which is convex in the direction of rotation 23 of the impeller 15. Here again, the arrangement is such that the corner point 26 of the trailing edge 21 lying at the inner torus 27 is displaced by an angle of rotation 28 in the direction of rotation 23 forwardly with respect to the corner point 29 at the outer torus 30 and, furthermore, the corner point 26 is arranged in the zone between the angle of inclination 36 of 35° and the angle of inclination 37 of 45°.

Figure 10:
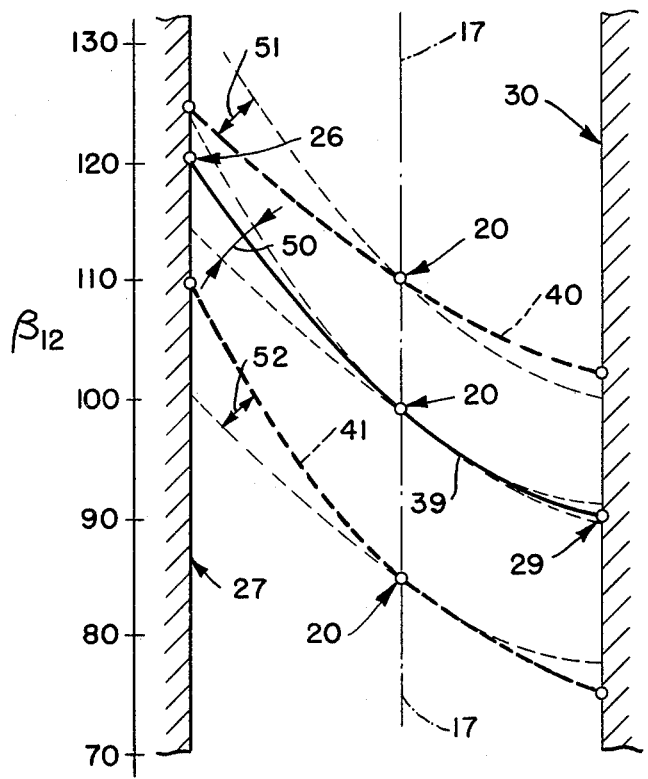
FIG. 10 is a graphical illustration of the trailing angles at the trailing edge applicable to either embodiment of the impeller blade of the present invention.

In accordance with a further development of the present invention, the blade 14 in both embodiments is provided with a twist in a region of the trailing edge 21 fashioned in the manner illustrated in FIG. 10. Preferably, the twist extends along a parabola 39 with the trailing angle $\beta_{12}$ changing from a value of about 120° at the corner point 26 of the trailing edge 21 at the inner torus 27 by a value of about 99° at the point 20 of the central flow thread 17 to a value of about 90° at the corner point 29 of the trailing edge 21 at the outer torus 30. The position of the parabola could deviate therefrom to a minor extent by rotation about the point 20 and by an angle of rotation 50. As can be seen from the course of the parabolas 40 and 41, the trailing angle $\beta_{12}$ at the point 20 of the central flow thread 17 is to be not substantially larger than 110° and not substantially smaller than 80°. The position of the parabola 40 for the maximum trailing angle at the central flow thread 17 can be varied by rotation of the parabola about its point of intersection 20 at the central flow thread 17 and by an angle of rotation 51. The limited positional variability of the parabola 41 is indicated by the angle of rotation 52.

The use of the expressions rotation and angle of rotation are understood merely to mean that a change in the position of the parabola must always be effected in such a way that, upon an enlargement of the trailing angle $\beta_{12}$ at the inner torus 27, there must be a reduction of the trailing angle $\beta_{12}$ at the outer torus 30; whereas, upon a reduction of the trailing angle $\beta_{12}$ at the inner torus 27, there must be an enlargement of the trailing angle $\beta_{12}$ at the outer torus 30 wherein, in both cases, the trailing angle at the point 20 of the central flow thread remains unchanged and the change of the trailing angle takes place along the trailing edge 21 between its corner points 26 and 29 along a configuration of a parabola.

Figure 2:
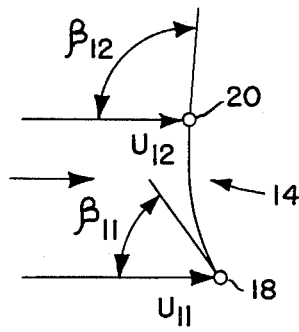
FIG. 2 is a graphic representation of the leading or entering and trailing or outlet angles of the impeller blade of the present invention.
Figure 4:
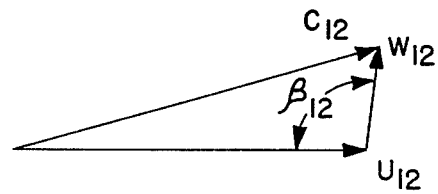
FIG. 4 is a velocity vector diagram at the exit or outlet of the impeller blade of the present invention.

FIG. 2 provides an example of the trailing angle $\beta_{12}$ at the point 20 between the trailing edge 21 and the central flow thread 17 resulting from the configuration of the parabola 39 in FIG. 10. FIG. 4 provides an example of a velocity vector diagram for the trailing angle for a specific impeller speed.

The blade 14 of the impeller 15 according to the present invention is constructed in the zone of its leading edge 19 identically in both embodiments and is intended for the purpose of rendering the torque conversion in the clutch or coupling range, that is, at higher speeds, to be relatively low in losses; whereas, the increase in the power transmission capacity obtained for the clutch or coupling range is prevented from becoming effective at the lower speeds. The leading edge 19 has leading angles $\beta_{11}$ between its corner points 31, 32, at the inner and outer torus 27, 30, which angles are preferably represented by the parabola 33 in FIG. 9.

Figure 9:
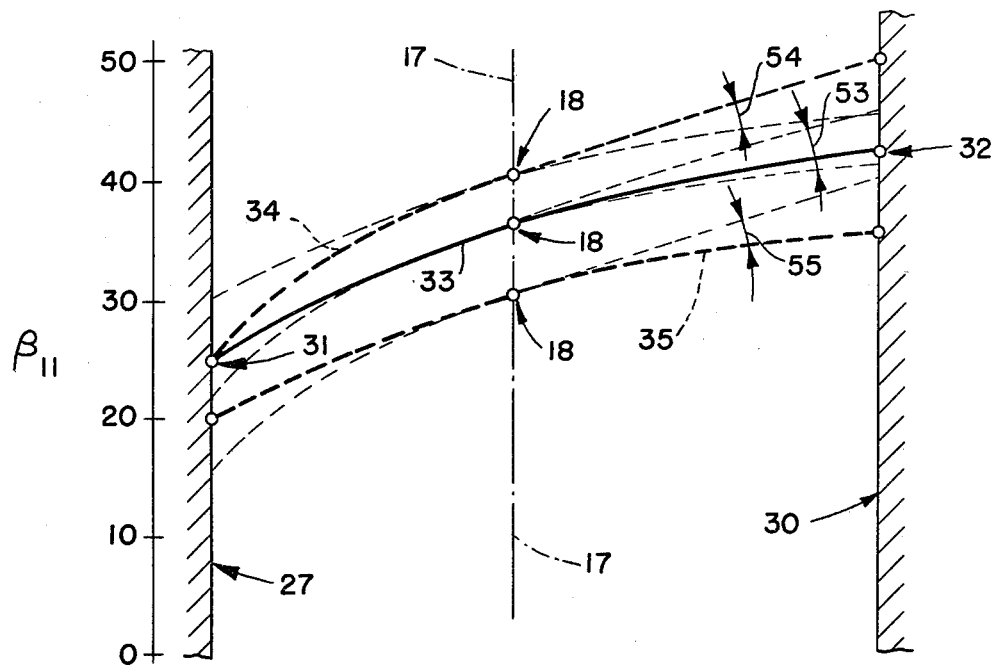
FIG. 9 is a graphic representation of the leading angles at the leading edge applicable to either of the embodiments of the impeller blade of the present invention.

According to FIG. 9, the leading angle $\beta_{11}$ at the point 18 of the central flow thread 17 has a value of about 36°. This leading angle $\beta_{11}$ diminishes toward the corner point 31 at the inner torus 27 to a value of about 24°. In contrast thereto, the leading angle $\beta_{11}$ increases from the point 18 to the corner point 32 at the outer torus 30 to a value of about 40°. While retaining the point of intersection 18 of the parabola at the central flow thread 17, the position of the parabola 33 can be changed to a minor extent in the zone 53 indicated in dashed lines so that when the leading angle $\beta_{11}$ is increased in the zone of the outer torus 30, there results a stronger blade twist; whereas, when the leading angle $\beta_{11}$ is reduced in the zone of the outer torus, there results a weaker blade twist. The parabola 34 provides an indication that the leading angle $\beta_{11}$ at the point 18 of the central flow thread 17 is to be no larger than 40°.

In this connection, the position of the parabola 34, while retaining its point of intersection 18 at the central flow thread 17, can be changed to a minor extent in the zone 54 indicated in dashed lines so that, upon a reduction of the leading angle in the zone of the outer torus 30, there is a weaker twist of the blade 14. The parabola 35 provides an indication of a minimum leading angle at the point 18 of the central flow thread 17 of about 28°. Here again, while retaining the point of intersection of the parabola 35 at the point 18 of the central flow thread 17, the position of the parabola 35 can be varied to a minor degree in the zone 55 indicated in dashed lines so that, upon an enlargement of the leading angle in the zone of the outer torus 30, a stronger blade twist is provided.

Figure 3:
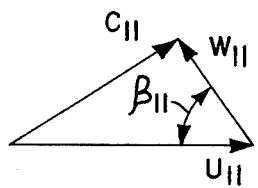
FIG. 3 is a velocity vector diagram at the entrance of the impeller blade of the present invention.

FIG. 2 provides an illustration of the leading angle given by the parabola 33 in FIG. 9 at the point 18 of the central flow thread 17. The velocity vector diagram pertaining to this leading angle at the speed of the impeller 15 assumed in FIG. 4 is shown in FIG. 3.

In the diagram of FIG. 13, the abscissa represents the velocity relationship of the turbine speed $n_T$ to the impeller speed $n_P$. Over this speed relationship, there are plotted, by means of the ordinate passing through the point of origin of the abscissa, the conversion ratio of the torque of the turbine wheel to the torque of the impeller, that is, $M_T$ to $M_P$ as well as the power transmission factor $N_P/k$ with $N_P$=power of impeller and also, by means of the ordinate passing through the value 1 of the speed relationship $n_T/n_P$, the degree of efficiency $N_T/N_P$, that is, power transmitted by the turbine wheel to power absorbed by the impeller 15 with the power transmission factor $k = \rho \times D^5_p \times \omega^3_p$; wherein, $\rho$=density of central flow, $D_p$=diameter of impeller, and $\omega_p$=angular velocity of impeller.

In the diagram of FIG. 13, the curves generally designated by the reference numerals 57 and 58 represent the characteristics of a conventional torque converter with conventional blading for the impeller for power transmission capacity and conversion ratio with the curve 59 representing the characteristic for a degree of efficiency of the conventional torque converter. The corresponding characteristics of a torque converter having the same diameters for the impeller wheel 15, turbine wheel 46 and stator 48 as the conventional torque converter but having an impeller blade constructed in accordance with the present invention are represented by the curves 60, 61, and 62.

The curve 60 in FIG. 13 clearly shows that, due to the constructional features of the blade of the present invention, a substantial increase in the power transmission capacity has been attained in a region of the clutch or coupling point without resulting in an undesirable rise in the power transmission capacity at lower speeds. The curves 61 and 62 furthermore show that, due to the constructional features of the blade of the present invention, the characteristic curves for the conversion ratio and degree of efficiency are not adversely affected.

Figure 11:
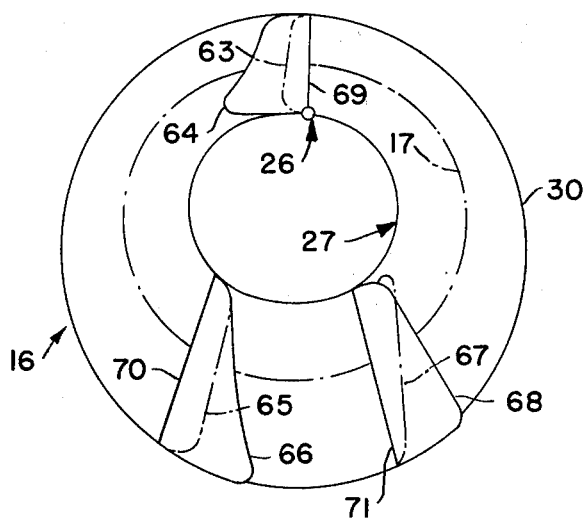
FIG. 11 is a schematic view of a meridional velocity distribution at the trailing blade edges of the impeller, turbine wheel, and stator in a conventional torque converter.

The influence exerted by the configuration of the blade 14 of the impeller 15 of the present invention on the meridional velocity distribution in the converter circuit is qualitatively illustrated in FIGS. 11 and 12. In these figures, the impeller outlet is denoted by the reference numeral 69, the turbine wheel outlet by the reference numeral 70, and the stator outlet by the reference numeral 71. FIG. 11 illustrates the velocity profiles 63, 64, and 65, 66 and 67, 68, respectively, not affected by the impeller construction of the present invention at the respective outlets 69, 70, or 71. In comparison, FIG. 12 represents the velocity profiles 72, 73, and 74, 75 and 76, 77, respectively, affected by the configuration of the blades 14 of the impeller 15 according to the present invention at the respective outlets 69, 70, or 71. The velocity profiles 64, 66, and 68 in FIG. 11 and 73, 75, and 77 in FIG. 12, illustrated as solid-line curves, represent the relationships in the starting point. In contrast thereto, the velocity profiles 63, 65, and 67 in FIG. 11 as well as the velocity profiles 72, 74, and 76 in FIG. 12, indicated in dot-dash lines, show the relationships at the clutch or coupling point.

The relationship of the trailing angle $\beta_{12}$ indicated in FIGS. 2 and 4 also holds true for the remaining blade trailing angles along the trailing edge 21 with the relationship of the blade angle $\beta_{11}$ indicated in FIGS. 2 and 3 also holding true for the remaining blade leading angles along the leading edge 19.

In FIG. 2, $U_{11}$ and $U_{12}$ respectively designate a sense of direction of peripheral speed to point 18 and 20 of blade 14, which is the same for all rotational speeds of the impeller 15, while in FIGS. 3 and 4, $U_{11}$ and $U_{12}$ respectively designate vectors of peripheral speeds of points 18, 20 for a given rotational speed of the impeller 15 with $C_{11}$ and $C_{12}$ designating vectors of the absolute flow velocity at points 18 and 20 with a certain rotational speed of the impeller 15. The reference character $W_{11}$, $W_{12}$ designate vectors of the relative flow velocity at points 18, 20 opposite to the blade 14 at a precise rotational speed of the impeller 15.

While we have shown and described only two embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A blade for an impeller of a hydrodynamic torque converter, the impeller being delimited by an inner and outer torus, the blade including a leading edge and a trailing edge, and a central flow thread for dividing the cross-sectional flow area into two equal portions, the central flow thread intersects a point of the leading edge and a point of the trailing edge, the point of intersection of the leading edge is displaced with respect to the point of intersection of the trailing edge along a smaller diameter as well as by an angle of rotation leading in a direction of rotation of the impeller, and the trailing edge is disposed in a radial plane at least approximately perpendicular to an axis of rotation of the impeller, characterized in that the point of the leading edge has a leading angle of about 30° to 40°, and in that the trailing edge is inclined at a trailing angle with respect to the axial plane containing the impeller axis and a corner point between the outer torus and the trailing edge by approximately 35°–45° such that a corner point of the trailing edge at the inner torus is displaced by an angle of rotation in the direction of rotation toward a front with respect to a corner point at the outer torus.

2. A blade according to claim 1, characterized in that a leading angle of the leading edge at a corner point of the leading edge with the inner torus is less than a leading angle at the point of intersection of the leading edge and central flow thread by about 10° to 15°, and in that a leading angle of the leading edge at a corner point of the leading edge with the outer torus is larger than the leading angle at the point of intersection of the leading edge and central flow thread by about 5° to 10°.

3. A blade according to claim 1, characterized in that the leading angle of the leading edge varies in the shape of a parabola.

4. A blade according to claim 1, characterized in that the trailing angle at the corner point of the trailing edge and the inner torus is larger than the trailing angle at the point of intersection of the trailing edge and central flow thread by about 15° to 25°, and in that the trailing angle at the corner point of the trailing edge and the outer torus is less than the trailing angle at the point of intersection of the trailing edge and central flow thread by about 8° to 10°.

5. A blade according to claim 1, characterized in that the trailing angle of the trailing edge varies in the shape of a parabola.

6. A blade according to claim 1, characterized in that the trailing edge lies on a straight line inclined with respect to an axial plane containing the axis of rotation of the impeller.

7. A blade according to claim 1, characterized in that the trailing edge lies in a plane of inclination intersecting an axial plane containing the axis of rotation of the impeller, and in that the plane of inclination has a convex curvature in a direction of rotation of the impeller.

8. A blade according to claim 1, characterized in that the trailing edge is inclined with respect to an axial plane containing the axis of rotation of the impeller as well as the corner point between the outer torus and trailing edge by an angle of inclination of about 35° to 45°.

9. A blade according to claim 8, characterized in that the angle of inclination is equal to 40°.

10. A blade according to claim 1, characterized in that the trailing angle of the trailing edge at the point of intersection with the central flow thread is about 85° to 110°.

11. A blade according to claim 10, characterized in that the trailing angle of the trailing edge at the point of intersection with the central flow thread is equal to 99°.

12. A blade according to claim 1, characterized in that the leading angle equals 36°.

13. A blade according to claim 12, characterized in that a leading angle of the leading edge at a corner point of the leading edge with the inner torus is less than a leading angle at the point of intersection of the leading edge and central flow thread by about 10° to 15°, and in that a leading angle of the leading edge at a corner point of the leading edge with the outer torus is larger than the leading angle at the point of intersection of the leading edge and central flow thread by about 5° to 10°.

14. A blade according to claim 13, characterized in that the leading angle of the leading edge varies in the shape of a parabola.

15. A blade according to claim 14, characterized in that the trailing edge is inclined with respect to an axial plane containing the axis of rotation of the impeller as well as the corner point between the outer torus and trailing edge by an angle of inclination of about 35° to 45°.

16. A blade according to claim 15, characterized in that the angle of inclination is equal to 40°.

17. A blade according to claim 16, characterized in that the trailing angle of the trailing edge at the point of intersection with the central flow thread is about 85° to 110°.

18. A blade according to claim 17, characterized in that the trailing angle of the trailing edge at the point of intersection with the central flow thread is equal to 99°.

19. A blade according to claim 18, characterized in that the trailing angle at the corner point of the trailing edge and the inner torus is larger than the trailing angle at the point of intersection of the trailing edge and central flow thread by about 15° to 25°, and in that the trailing angle at the corner point of the trailing edge and the outer torus is less than the trailing angle at the point of intersection of the trailing edge and central flow thread by about 8° to 10°.

20. A blade according to claim 19, characterized in that the trailing angle of the trailing edge varies in the shape of a parabola.

21. A blade according to claim 20, characterized in that the trailing edge lies on a straight line inclined with respect to the axial plane containing the axis of rotation of the impeller.

22. A blade according to claim 20, characterized in that the trailing edge lies in a plane of inclination intersecting the axial plane containing the axis of rotation of the impeller, and in that the plane of inclination has a convex curvature in a direction of rotation of the impeller.

* * * * *